No. 836,077. PATENTED NOV. 20, 1906.
T. J. AURAND.
CUSHION TIRE FOR WHEELS.
APPLICATION FILED NOV. 23, 1905.
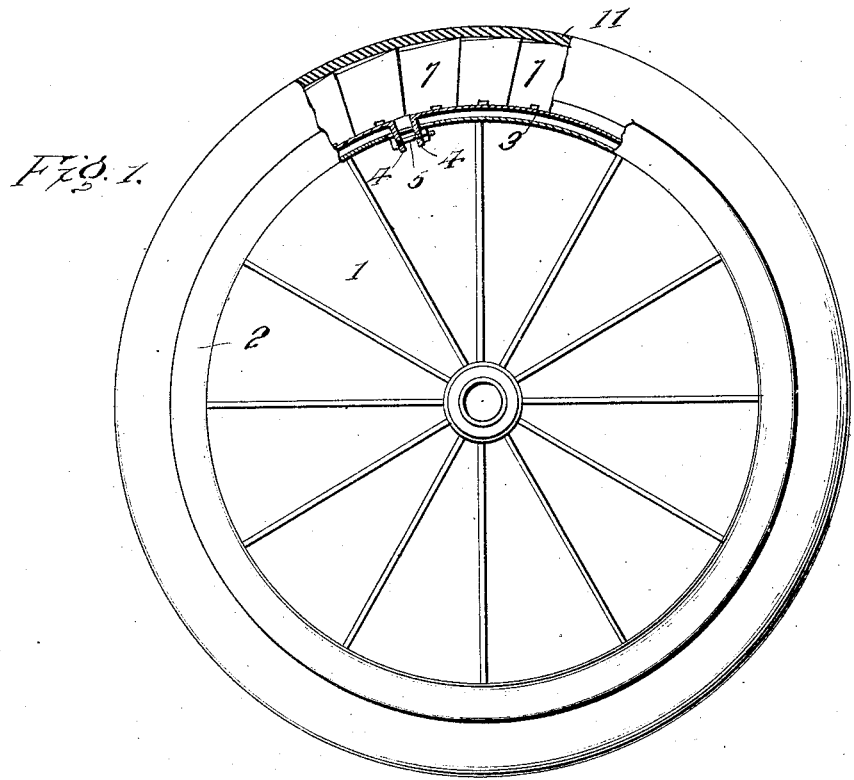
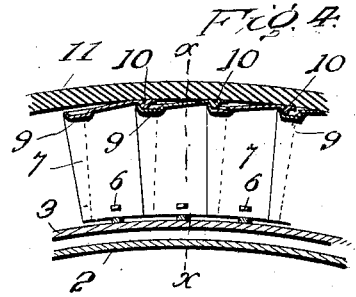
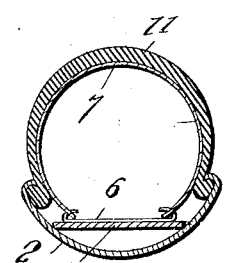
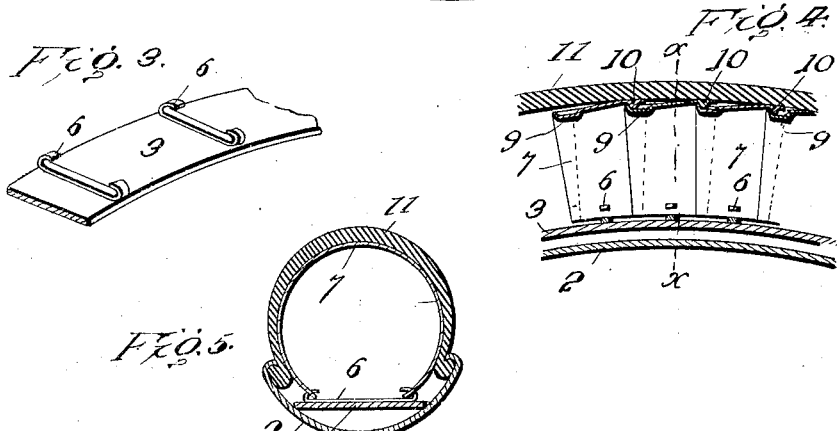
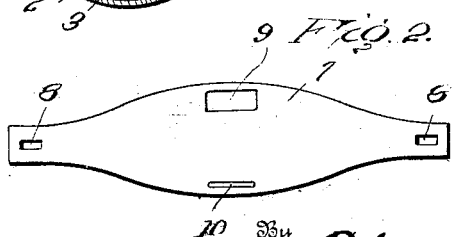
Inventor
T. J. Aurand,

UNITED STATES PATENT OFFICE.

THOMAS J. AURAND, OF WATSEKA, ILLINOIS.

CUSHION-TIRE FOR WHEELS.

No. 836,077.

Specification of Letters Patent.

Patented Nov. 20, 1906.

Application filed November 23, 1905. Serial No. 288,751.

*To all whom it may concern:*

Be it known that I, THOMAS J. AURAND, a citizen of the United States, residing at Watseka, in the county of Iroquois and State of Illinois, have invented certain new and useful Improvements in Cushion-Tires for Wheels, of which the following is a specification.

This invention relates to improvements in tires, and has for its object to provide an article of this character which will possess the softness and resiliency of a pneumatic tire, but which will be much more durable, owing to the fact that it is so constructed as to gain its elasticity from metallic springs.

With this object in view the invention comprises, essentially, a base member extended around the rim or felly of the wheel, an inner metallic-tire tube formed of overlapping sections, and means for movably connecting said sections to the base member.

For a full description of the invention and the merits thereof and also to acquire a knowledge of the details of construction of the means for effecting the result reference is to be had to the following description and accompanying drawings, in which—

Figure 1 is a side view of a wheel provided with a tire constructed in accordance with my invention, parts being broken away. Fig. 2 is a plan view of one of the sections of the metallic-tire tube. Fig. 3 is a perspective view of a portion of the base member, showing the method of attaching the hooked members thereto. Fig. 4 is a transverse sectional view through the tire, and Fig. 5 is a sectional view on the line *x x* of Fig. 4.

Corresponding and like parts are referred to in the following description and indicated in all the views of the drawings by the same reference characters.

The numeral 1 designates a wheel of any conventional type, and 2 the rim or felly thereof, which is shown in the drawings as having a concaved outer face, although this is by no means an essential feature of my invention. A base member 3 which is preferably in the form of a metallic band, extends around the rim 2 and has its opposite ends bent inwardly at approximately right angles and passed through an opening in the rim 2. These inwardly-bent portions 4 of the baseband are perforated and connected by any suitable fastening means, such as a bolt 5. This enables the base-band to be drawn tightly in position, so as to be securely held against lateral displacement. Hooked members 6 project from the edges of the base-band 3 at suitable intervals and are preferably in the form of transverse strips secured to the band 3 and having their ends bent backwardly upon themselves. The sections 7, forming part of the tire, are in the form of metallic strips having their middle portion broadened and curved, while their ends are provided with longitudinal slots 8 for engagement with the hooked members 6. The broadened portions of the sections 7 overlap each other, as will be readily seen in Fig. 1, the side of each section fitting beneath the edge of the adjacent section, being provided with a depression 9, which serves as a guideway for an inward projection 10 upon the edge of the outer section. This construction enables the various sections to slip over each other and telescope a certain amount, as may be necessary when they are pressed inwardly when in use. The slots 8 also have a sliding connection with the hooked members 6 and are hence movably connected to the baseband 3. This has the advantage of enabling them to give in a lateral direction as well as in a direction normal to the rim.

In order to exclude dirt and foreign matter from the metallic tube and to form a muffle for the noise which would necessarily result from their slipping upon each other, an outer protective casing 11 is employed. This outer tire 11 may be of any suitable form, but is preferably of the clencher type, as shown in the drawings. It will thus be apparent that, owing to the construction of the metallic tube, the sections thereof are permitted to move upon each other, so as to form a spring-cushion which is adapted to resist both normal and lateral pressure.

Having thus described my invention, what I claim as new is—

1. The combination with the rim of a wheel, of a base-band secured thereto and having hooked members projecting from the edges thereof, and a metallic tire formed of overlapping sections, said sections having slotted ends which are loosely connected to the baseband by means of the before-mentioned hooked members.

2. The combination with the rim of a wheel, of a base member secured thereto, transverse members secured to the base members and having hooked ends, and a metallic tire formed in overlapping sections, the ends of said sections being slotted and movably connected to the base member by means of the hooked ends of the transverse members.

3. The combination with the rim of a wheel, of a base-band secured thereto, a metallic tire formed in overlapping transverse sections, said sections having their ends loosely connected to the base-band, and means for preventing the overlapping portions of the sections from slipping past each other.

4. In combination with the rim of a wheel, a base-band secured thereto, and having hooked members projecting from the edges thereof, a metallic tire formed in overlapping sections, the ends of said sections being slotted and movably connected to the base-band by means of the hooked members projecting therefrom, and means for preventing the overlapping portions of the sections from slipping past each other.

5. In combination with the rim of a wheel, a base-band secured thereto, and having hooked members projecting from the edges thereof, and a metallic tire formed in overlapping sections the ends of which are slotted and movably connected to the base-band by means of the hooked members projecting therefrom, each of said sections having a depression in one side thereof which serves as a guideway for a projection upon the overlapping side of the adjacent section.

6. In combination with the rim of a wheel, a base-band secured thereto, and having hooked members projecting from the edges thereof, a metallic tire formed in overlapping sections the ends of which are slotted and movably connected to the base-band by means of the hooked members projecting therefrom, each of said sections having a depression in one side thereof which serves as a guideway for the projection upon the overlapping side of the adjacent section, and an outer protective cover fitting around the metallic tire.

In testimony whereof I affix my signature in presence of two witnesses.

THOMAS J. AURAND. [L. S.]

Witnesses:
F. H. HIGGINS,
FRED AURAND.